(12) United States Patent
Jung et al.

(10) Patent No.: US 9,393,991 B2
(45) Date of Patent: Jul. 19, 2016

(54) POWER STEERING PUMPING APPARATUS FOR VEHICLE

(71) Applicant: Hyundai Motor Company, Seoul (KR)

(72) Inventors: Dae Suk Jung, Hoengcheon-myeon (KR); Soo Bo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 273 days.

(21) Appl. No.: 14/079,555

(22) Filed: Nov. 13, 2013

(65) Prior Publication Data

US 2014/0147303 A1    May 29, 2014

(51) Int. Cl.
| | |
|---|---|
| *F04C 2/08* | (2006.01) |
| *B62D 5/06* | (2006.01) |
| *B62D 5/065* | (2006.01) |
| *F04C 15/00* | (2006.01) |

(52) U.S. Cl.
CPC .............. *B62D 5/063* (2013.01); *B62D 5/064* (2013.01); *B62D 5/065* (2013.01); *F04C 2/086* (2013.01); *F04C 15/0019* (2013.01)

(58) Field of Classification Search
CPC ............ F04C 2/08; F04C 2/082; F04C 2/084; F04C 2/086; F04C 14/18; F04C 14/20; F04C 14/22; F04C 14/223; F04C 14/226; F04C 15/0019; B60W 10/30; B62D 5/06; B62D 5/12; B62D 5/14; B62D 5/064; B62D 5/065

USPC ......................................................... 417/410.4
See application file for complete search history.

(56) References Cited

U.S. PATENT DOCUMENTS

| | | | | |
|---|---|---|---|---|
| 1,783,209 | A * | 12/1930 | Wilsey ................ | F04C 15/0011 418/129 |
| 4,860,867 | A * | 8/1989 | Nishimura ............ | F16D 27/112 192/200 |
| 6,817,438 | B2 * | 11/2004 | Modrzejewski ....... | B62D 5/062 180/421 |
| 2009/0133953 | A1 | 5/2009 | Sheridan et al. | |
| 2012/0076676 | A1 * | 3/2012 | Lee ......................... | F04B 35/04 417/362 |

FOREIGN PATENT DOCUMENTS

| | | |
|---|---|---|
| KR | 1997-0001074 Y1 | 2/1997 |
| KR | 1998-048520 A | 9/1998 |
| KR | 10-0875544 B1 | 12/2008 |

* cited by examiner

*Primary Examiner* — Peter J Bertheaud
(74) *Attorney, Agent, or Firm* — Morgan, Lewis & Bockius LLP

(57) ABSTRACT

A power steering pumping apparatus for a vehicle may include a driving motor, a power steering pump connected to a first side of a shaft of the driving motor, a compressor connected to a second side of the shaft of the driving motor, and a clutch disposed between the driving motor and the compressor and intermitting power between the driving motor and the compressor.

3 Claims, 5 Drawing Sheets

(SUPPLIED FLOW RATE IS MAXIMUM)

----- FLOW RATE FLOW (SUPPLIED FLOW RATE IS MINIMUM)

POWER STEERING PUMPING APPARATUS FOR VEHICLE

CROSS-REFERENCE TO RELATED APPLICATION

The present application claims priority to Korean Patent Application No. 10-2012-0133593 filed on Nov. 23, 2012, the entire contents of which is incorporated herein for all purposes by this reference.

BACKGROUND OF THE INVENTION

1. Field of the Invention

The present invention relates to a power steering pumping apparatus for a vehicle, and more particularly, to a technology capable of generating oil pressure required for power steering and driving an air conditioner compressor with driving force of an electrical motor.

2. Description of Related Art

An electrical power steering apparatus and an electrical air conditioner mounted in a vehicle according to the related art are configured to have separate components as shown in FIG. 1.

That is, the electrical power steering apparatus according to the related art is configured to drive a pump 500 pumping oil pressure required for power steering by a separate pump motor 502, the electrical air conditioner is configured to drive a compressor 504 by a separate compressor motor 506, and the electrical power steering apparatus and the electrical air conditioner include separate controllers 508 and 510, respectively, to control the pump motor 502 and the compressor motor 506, respectively.

Recently, in accordance with an increase in a demand for improvement of fuel efficiency of a vehicle and an environment vehicle, there is a need to integrate the components configured as separate systems as described above with each other to decrease used energy, thereby contributing to improvement of fuel efficiency of the vehicle and decreasing a cost of the vehicle.

The contents described as the related art have been provided only for assisting in the understanding for the background of the present invention and should not be considered as corresponding to the related art known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power steering pumping apparatus for a vehicle configured to accomplish both of generation of oil pressure for implementing power steering and compression of a refrigerant of an air conditioner with rotational force generated in a single motor, such that a power steering apparatus and the air conditioner are partially integrated with each other to decrease the number of required components, required materials, and the like, thereby making it possible to decrease a cost of the vehicle, and decrease use of energy required for an operation, thereby making it possible to contribute to improvement of fuel efficiency of the vehicle.

In an aspect of the present invention, a power steering pumping apparatus for a vehicle may include a driving motor, a power steering pump connected to a first side of a shaft of the driving motor, a compressor connected to a second side of the shaft of the driving motor, and a clutch disposed between the driving motor and the compressor and intermitting power between the driving motor and the compressor.

The power steering pump is a variable pump configured for varying a pumped flow rate.

The clutch may include a first disk connected to the second side of the shaft of the driving motor, a second disk connected to a shaft of the compressor and coaxially facing the first disk so as to be adjacent to the first disk, a spring elastically supporting the second disk so as to form a predetermined interval between the first disk and the second disk, and an electromagnet selectively generating magnetic force for pulling the second disk toward the first disk.

The power steering pump may include a housing, a first gear rotatably coupled to the housing and connected to the first side of the shaft of the driving motor, a second gear rotatably coupled to the housing and engaged with the first gear to be rotated with the first gear, cam plates pivotally coupled to the housing and enclosing outer peripheral surfaces of the first and second gears, respectively for varying a gap between the cam plates and the outer peripheral surfaces of the first and second gears, and an actuator coupled to the cam plates and configured to adjust the gap.

The cam plates may include a fixing pin pivotally coupled to the housing respectively and are disposed in the housing at both sides of the first and second gears, respectively, the cam plates being pivotable with respect to the fixing pin respectively, and the actuator may include a screw coupled to the cam plates while penetrating through the cam plates at an opposite side to the fixing pin based on the first and second gears and rotated to vary a distance between the cam plates, and a servo motor connected to the screw to rotate the screw.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
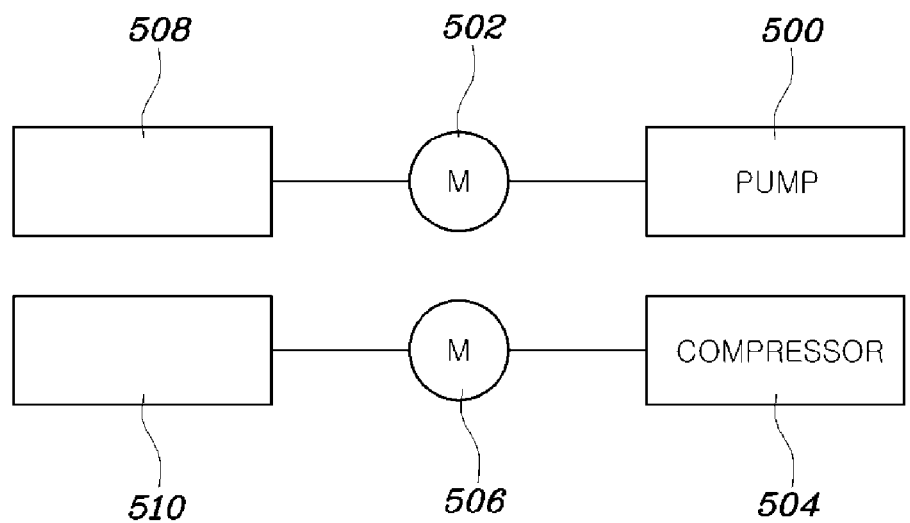
FIG. 1 is a diagram for describing power steering apparatus and an air conditioner according to the related art.
Figure 2:
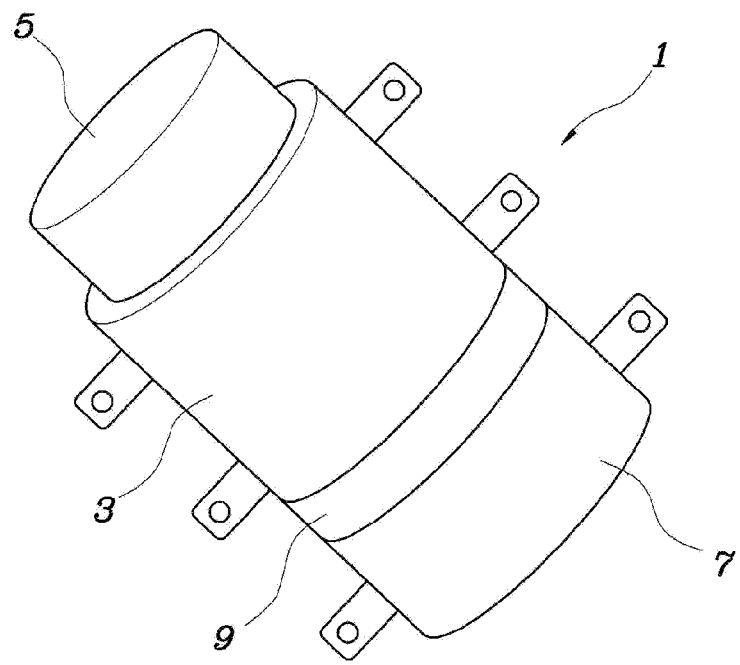
FIG. 2 is a diagram showing a power steering pumping apparatus for a vehicle according to an exemplary embodiment of the present invention.
Figure 3:
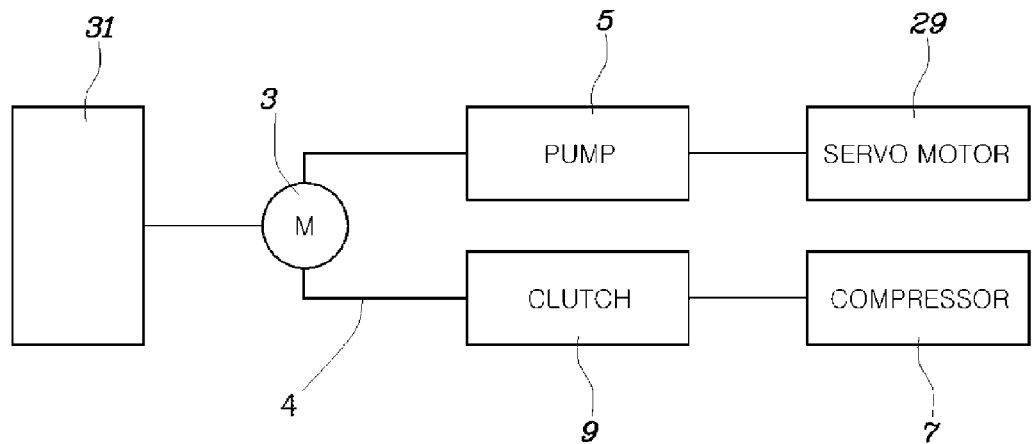
FIG. 3 is a diagram for describing a configuration of the power steering pumping apparatus for a vehicle according to the exemplary embodiment of the present invention compared with FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 2 to 5, a power steering pumping apparatus 1 for a vehicle according to an exemplary embodiment of the present invention is configured to include a driving motor 3, a power steering pump 5 connected to one side of a shaft 4 of the driving motor 3, a compressor 7 connected to the other side of the shaft 4 of the driving motor 3, and a clutch 9 intermitting power between the driving motor 3 and the compressor 7.

That is, the power steering pump 5 and the compressor 7 are driven using a single driving motor 3, thereby making it possible to remove one of motors separately provided in order to drive each of the power steering pump 5 and the compressor 7 in the related art. In addition, the power steering pump 5 and the compressor 7 are packaged in a single body as shown, such that the number of required components, a weight, and a volume occupied by the power steering pump 5 and the compressor 7 at a portion at which the power steering pump 5 and the compressor 7 are mounted in the vehicle may be decreased.

Figure 4:
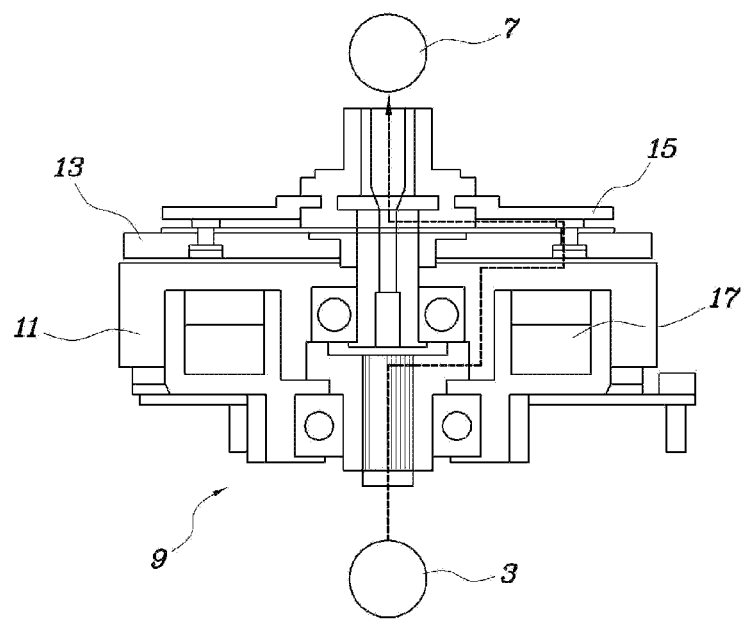
FIG. 4 is a diagram an example of a clutch of FIG. 2.
Figure 5:
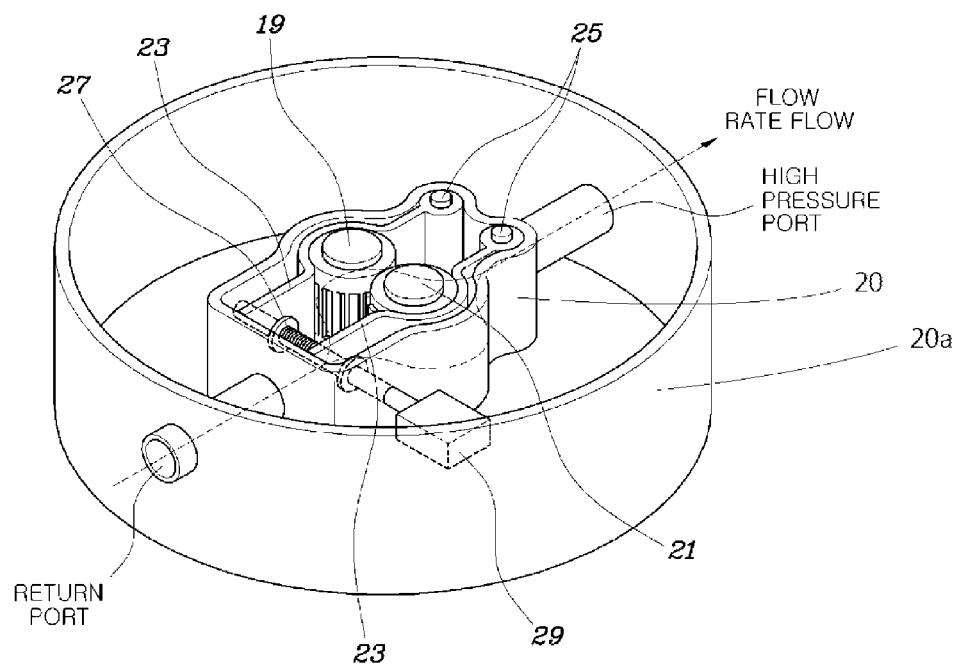
FIG. 5 is a diagram for describing a structure of a power steering pump of FIG. 2.

The clutch 9 is configured to include a first disk 11 connected to the shaft of the driving motor 3, a second disk 13 connected to a shaft of the compressor 7 and coaxially facing the first disk 11 so as to be adjacent to the first disk 11, a spring 15 elastically supporting the second disk 13 so as to form a predetermined interval from the first disk 11, and an electromagnet 17 generating magnetic force pulling the second disk 13 toward the first disk 11, as shown in FIG. 4 in the present embodiment.

Therefore, in the case in which electricity is not supplied to the electromagnet 17, the second disk 13 is spaced apart from the first disk 11 by the spring 15, such that a blocking state in which rotational force is not transferred to the second disk 13 may be maintained, and in the case in which the electricity is supplied to the electromagnet 17, the second disk 13 is compressed to the first disk 11 to receive the rotational force, such that power is supplied to the compressor 7.

It is preferable that the power steering pump 5 is a variable pump capable of varying a pumped flow rate.

That is, when the power steering pump 5 is a fixed pump discharging a constant flow rate in the situation in which the compressor 7 is operated, the flow rate may be excessively pumped in some cases. Therefore, it is preferable that a flow rate pumped by the power steering pump 5 may be controlled independently of the compressor 7 during an operation of the compressor 7.

In the present embodiment, the power steering pump 5 is configured to include a first gear 19 connected to the shaft of the driving motor 3, a second gear 21 engaged with the first gear 19 in a housing 20 to thereby be rotated, two cam plates 23 rotated to vary a degree in which they are closely adhered to outer peripheral surfaces of the first and second gears 19 and 21 while enclosing the outer peripheral surfaces of the first and second gears 19 and 21, respectively, and an actuator installed to adjust the degree in which the two cam plates 23 are closely adhered to the outer peripheral surfaces of the first and second gears 19 and 21.

The cam plates 23 are disposed at both sides of the first and second gears 19 and 21, respectively, in the state in which they are rotatable with respect to a fixing pin 25 pivotally coupled to a bottom surface of the housing 20a, and the actuator is configured to include a screw 27 coupled to the two cam plates 23 while penetrating through the two cam plates 23 at an opposite side to the fixing pin 25 based on the first and second gears 19 and 21 and rotated to vary a distance between the two cam plates 23 and a servo motor 29 installed to rotate the screw 27.

Here, the servo motor 29, which is a small motor capable of operating the cam plates 23, has a capacity, a size, a cost, and a weight significantly smaller than those of a motor according to the related art driving the power steering pump 5 or the compressor 7 and does not damage an object of the present invention.

Figure 6:
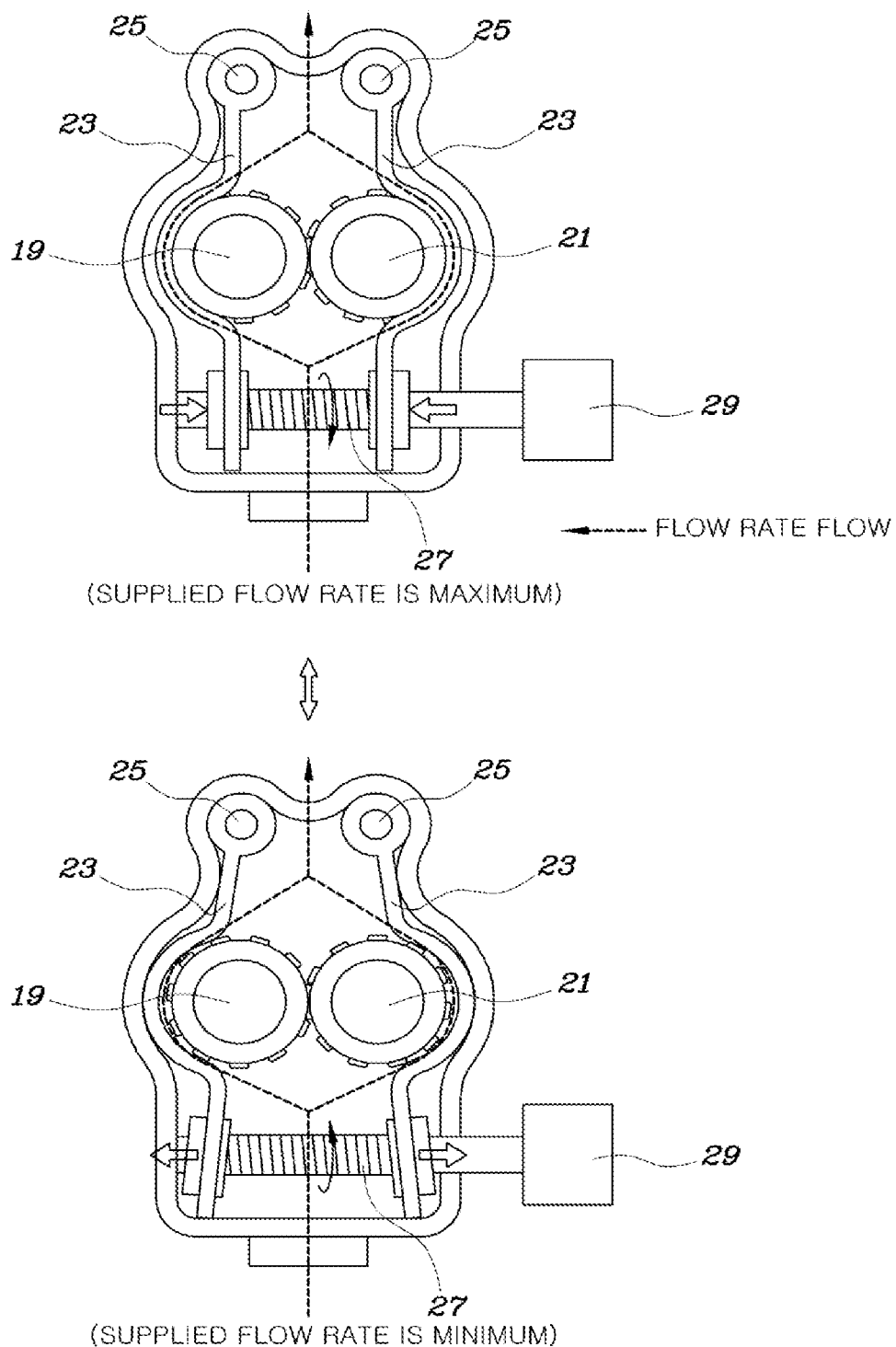
FIG. 6 is a diagram for describing a flow rate variable principle of the power steering pump of FIG. 5.

As shown in FIG. 6, when the cam plates 23 become close to each other based on the first and second gears 19 and 21 from the left and the right by driving the servo motor 29, a close pumping space is formed between the cam plates 23 and the first and second gears 19 and 21, such that a supplied flow rate is maximized, and when the cam plates 23 become distant from each other, the cam plates 23 and the first and second gears 19 and 21 become distant from each other, such that a supplied flow rate is gradually decreased.

Figure 7:
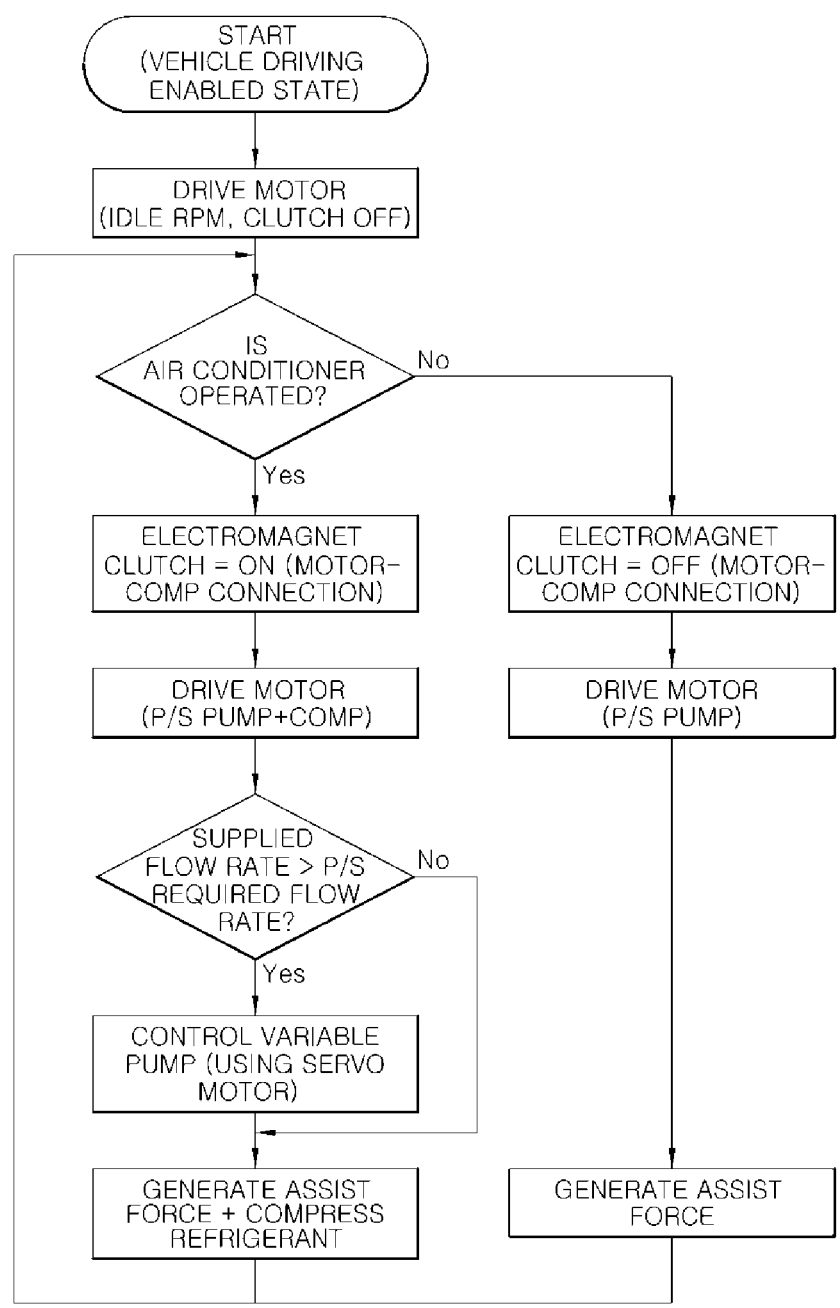
FIG. 7 is a diagram showing a method of controlling the power steering pumping apparatus for a vehicle according to the exemplary embodiment of the present invention.

The power steering pumping apparatus 1 for a vehicle configured as described above may be controlled by a control logic as shown in FIG. 7. In this case, it is preferable that a control of the electromagnet 17 and the servo motor 29 of the clutch 9 is implemented by an integrated controller 31.

Referring to FIG. 7, when the vehicle is in a driving enabled state in which it may be steered, the controller 31 immediately drives the driving motor 3 to enable immediate steering while operating the power steering pump 5.

In this case, basically, electricity is not supplied to the electromagnet 17, such that power is not transferred to the compressor 7 by blockage of the clutch 9.

The state of the clutch 9 as described above is maintained as long as a user does not operate an air conditioner. When the user operates the air conditioner, the controller operates the electromagnet 17 to allow the clutch 9 to be in the state in power of the driving motor 3 is transferred to the compressor 7.

Therefore, the compressor 7 compresses a refrigerant to perform an indoor air-cooling operation. In this case, the power of the driving motor 3 is simultaneously transferred to the power steering pump 5 and the compressor 7.

In this case, whether a flow rate generated and supplied by the power steering pump 5 is an actually required flow rate or more is monitored, and the servo motor 29 is controlled in the case in which the flow rate generated and supplied by the power steering pump 5 is the actually required flow rate or more, thereby varying the flow rate generated by the power steering pump 5.

The power steering pumping apparatus for a vehicle according to the exemplary embodiment of the present invention is configured to accomplish both of generation of oil pressure for implementing power steering and compression of a refrigerant of an air conditioner with rotational force generated in a single motor, such that a power steering apparatus and the air conditioner are partially integrated with each other to decrease the number of required components, required materials, and the like, thereby making it possible to decrease a cost of the vehicle, and decrease use of energy required for an operation, thereby making it possible to contribute to improvement of fuel efficiency of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power steering pumping apparatus for a vehicle, comprising:
    a driving motor;
    a power steering pump connected to a first side of a shaft of the driving motor;
    a compressor connected to a second side of the shaft of the driving motor; and
    a clutch disposed between the driving motor and the compressor and intermitting power between the driving motor and the compressor,
    wherein the power steering pump includes:
        a housing;
        a first gear rotatably coupled to the housing and connected to the first side of the shaft of the driving motor;
        a second gear rotatably coupled to the housing and engaged with the first gear to be rotated with the first gear;
        cam plates pivotally coupled to the housing and enclosing outer peripheral surfaces of the first and second gears, respectively for varying a gap between the cam plates and the outer peripheral surfaces of the first and second gears; and
        an actuator coupled to the cam plates and configured to adjust the gap,
    wherein the cam plates include a fixing pin pivotally coupled to the housing respectively and are disposed in the housing at both sides of the first and second gears, respectively, the cam plates being pivotable with respect to the fixing pin respectively, and
    wherein the actuator include:
        a screw coupled to the cam plates while penetrating through the cam plates at an opposite side to the fixing pin based on the first and second gears and rotated to vary a distance between the cam plates; and
        a servo motor connected to the screw to rotate the screw.

2. The power steering pumping apparatus for the vehicle of claim 1, wherein the power steering pump is a variable pump configured for varying a pumped flow rate.

3. The power steering pumping apparatus for the vehicle of claim 1, wherein the clutch includes:
    a first disk connected to the second side of the shaft of the driving motor;
    a second disk connected to a shaft of the compressor and coaxially facing the first disk so as to be adjacent to the first disk;
    a spring elastically supporting the second disk so as to form a predetermined interval between the first disk and the second disk; and
    an electromagnet selectively generating magnetic force for pulling the second disk toward the first disk.

* * * * *